United States Patent
Weaver et al.

(10) Patent No.: US 10,502,063 B2
(45) Date of Patent: Dec. 10, 2019

(54) AIRFOIL AND METHOD OF FABRICATING SAME

(71) Applicant: General Electric Company, Schenectady, NY (US)

(72) Inventors: Scott Andrew Weaver, Ballston Lake, NY (US); Scott Michael Oppenheimer, Schenectady, NY (US); William Thomas Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 15/609,602

(22) Filed: May 31, 2017

(65) Prior Publication Data

US 2018/0347368 A1 Dec. 6, 2018

(51) Int. Cl.
*F01D 5/14* (2006.01)

(52) U.S. Cl.
CPC .......... *F01D 5/147* (2013.01); *F05D 2230/21* (2013.01); *F05D 2230/50* (2013.01)

(58) Field of Classification Search
CPC .......... F01D 5/187; F01D 5/147; F01D 5/005; B33Y 80/00; B22F 5/04; B22F 7/062; B22F 3/1055
See application file for complete search history.

(56) References Cited

U.S. PATENT DOCUMENTS

| | | | | |
|---|---|---|---|---|
| 3,854,842 A | * | 12/1974 | Caudill | F01D 5/147 415/116 |
| 4,390,320 A | * | 6/1983 | Eiswerth | F01D 5/005 29/889.1 |
| 4,411,597 A | * | 10/1983 | Koffel | B23P 6/005 416/224 |
| 7,255,531 B2 | | 8/2007 | Ingistov | |
| 2009/0202355 A1 | | 8/2009 | Dierksmeier et al. | |
| 2014/0255194 A1 | * | 9/2014 | Jones | F01D 5/225 416/212 A |
| 2015/0104326 A1 | | 4/2015 | Waldman et al. | |
| 2016/0090848 A1 | | 3/2016 | Engeli et al. | |
| 2016/0108749 A1 | | 4/2016 | Evans et al. | |
| 2016/0115795 A1 | | 4/2016 | Munoz et al. | |
| 2017/0051624 A1 | | 2/2017 | Romanov et al. | |

OTHER PUBLICATIONS

Weaver, Scott Andrew "Airfoil and Method of Fabricating Same", U.S. Appl. No. 15/606,377, filed May 26, 2017, 30 pages.

* cited by examiner

*Primary Examiner* — Kevin A Lathers
(74) *Attorney, Agent, or Firm* — Joseph Christian

(57) ABSTRACT

A method of fabricating an airfoil includes forming a tip portion and imaging a second end of a body portion to obtain image data of one or more mortises formed therein. One or more tenons are formed on the first end of the tip portion using the image data of the second end of the body portion. The one or more tenons are manufactured using one of additive or subtractive manufacturing techniques. To complete assembly, the first end of the tip portion is positioned relative to the second end of the body portion such that each of the one or more tenons of the tip portion align with and are in sliding engagement with a respective one of the one or more mortises of the body portion. The body portion and the tip portion are coupled together such that the tip portion and the body portion form the airfoil. An airfoil formed by the method is also disclosed.

16 Claims, 14 Drawing Sheets

AIRFOIL AND METHOD OF FABRICATING SAME

BACKGROUND

The field of the disclosure relates generally to airfoils and more particularly to airfoils including a body portion and a tip portion coupled to the body portion.

At least some known airfoils include a tip portion and a body portion. Under at least some operating conditions, the tip portion and the body portion experience different loads. In at least some known airfoils, the tip portion and the body portion are assembled separately and are configured to withstand different loads and different temperatures. While the tip portion is typically configured stronger than the blade portion, after a period of time in service, the tip portion may become eroded, oxidized, and/or corroded by impingement of the hot combustion gases, or the like. Because the airfoil may be expensive to produce, repair or refurbishment of the damaged airfoil may be preferred if possible. In at least some known airfoils, the body portion of the airfoil is formed in an open-tip or tipless casting process and the tip portion is coupled to the body portion after the body portion is formed. The use of open tip or tipless turbine blade casting allows improved casting yield by reducing core shift during single-crystal directional solidification process. Reducing core shift is critical in producing high cooling efficient thin-walled turbine blades. However, subsequent to casting the body portion, one has to bond or build a blade tip on top of the tipless body portion.

Similarly, during the repair of an airfoil, the damaged tip portion may be removed, such as through grinding, to allow for a replacement tip portion to be welded or otherwise attached to the body portion. However, in both initial manufacture of the airfoil, or in repair of the airfoil, coupling the tip portion to the body portion requires that the tip portion be precisely aligned on the body portion, as well as any features, such as one or more interior cooling passages extending through the body portion and the tip portion. The meticulous procedure needed to align the parts is laborious, tedious and production non-friendly. For at least some known airfoils, the alignment process requires specialized equipment. For example, to assemble at least some known airfoils, the tip portion is positioned on the body portion and clamped in position. In many instances, the common cast tip can have issues with alignment of the cooling passages to an unfamiliar blade. If the tip portion and the body portion are misaligned, the airfoil has an increased risk of failure during its service life.

BRIEF DESCRIPTION

The present application is directed to a method of fabricating an airfoil, the airfoil including a tip portion including a first end and a second end and a body portion including a first end and a second end. The method includes forming the tip portion, imaging the second end of the body portion to obtain image data of one or more mortises formed therein, forming one or more tenons extending therefrom the first end of the tip portion using the image data of the second end of the body portion, positioning a first end of the tip portion relative to the second end of the body portion such that the one or more tenons of the tip portion align with and engage with the one or more mortises of the body portion and coupling the first end of the tip portion to the second end of the body portion such that the tip portion and the body portion form the airfoil.

In another embodiment of the present application, a method of fabricating an airfoil, the airfoil including a tip portion including a tip portion including a first end and a second end and a body portion including a first end and a second end. The method includes forming the tip portion, imaging a second end of the body portion to obtain image data of one or more mortises formed therein an end portion, manufacturing one or more tenons extending therefrom the first end of the tip portion using the image data of the second end of the body portion, wherein the step of manufacturing includes one of additive manufacturing or subtractive manufacturing, depositing a bonding material on at least one of a first end of the tip portion, the one or more tenons and a second end of the body portion, positioning the first end of the tip portion relative to the second end of the body portion to allow sliding engagement of each of the one or more tenons into a respective one of the one or more mortise and define a mechanical interlocking interface and coupling the first end of the tip portion to the second end of the body portion such that the tip portion and the body portion form the airfoil.

In yet another embodiment of the present application, an airfoil of a rotary machine is provided. The airfoil includes a tip portion comprising a first end and a second end and a body portion comprising a first end and a second end. The tip portion including one or more tenons extending from the first end. The second end of the body portion configured to couple to said first end of said tip portion. Said body portion including one or more mortises extending into the second end. Each of said one or more tenons of the tip portion are in sliding engagement with a corresponding one of said one or more mortises of the body portion. The one or more tenons of the tip portion are based on image data of the second end of the body portion.

These and other features and improvements of the present application will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings in which.

Figure 1:
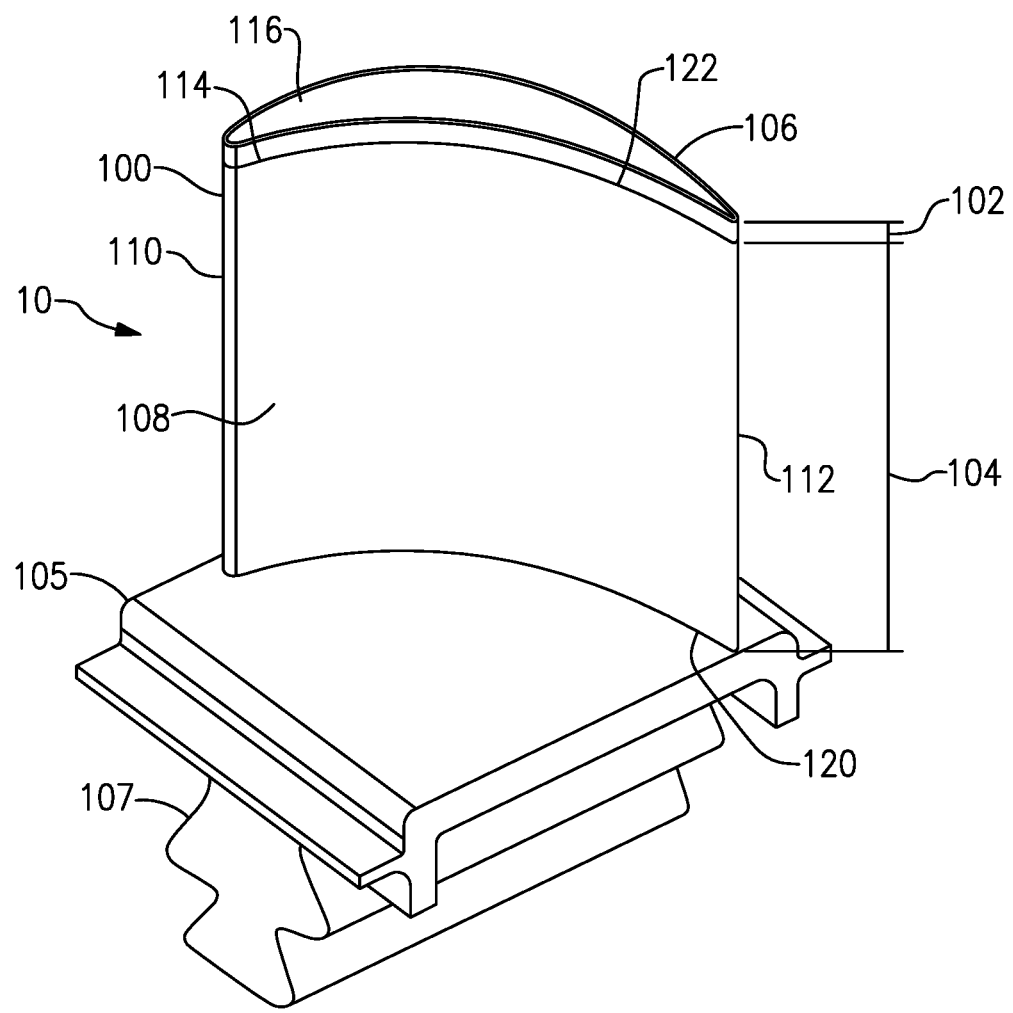
FIG. 1 is a perspective view of an exemplary airfoil including a tip portion and a body portion, in accordance with one or more embodiments shown or described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

As an initial matter, in order to clearly delineate the invention of the current application, it may be necessary to select terminology that refers to and describes certain parts or machine components within a combustion turbine engine. As mentioned, while the examples provided herein are primarily aimed at combustion turbine engines, those of ordinary skill in the art will appreciate that the present invention is applicable to the rotor blades used in combustion or steam turbine engines. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often a particular component may be referred to using several different terms. In addition, what may be described herein as being single part may include and be referenced in another context as consisting of multiple components, or, what may be described herein as including multiple components may be referred to elsewhere as a single part. As such, in understanding the scope of the present invention, attention should not only be paid to the terminology and description provided herein, but also to the structure, configuration, function, and/or usage of the component, particularly as provided in the appended claims.

In addition, several descriptive terms may be used regularly herein, and it should prove helpful to define these terms at the onset of this section. Accordingly, these terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. As such, the term "downstream" corresponds to the direction of flow of the fluid, and the term "upstream" refers to the direction opposite to the flow. The term "radial" refers to movement or position perpendicular to an axis. It is often required to describe parts that are at differing radial positions with regard to a center axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The singular forms "a", "an", and "the" include plural references unless the context clearly dictates otherwise. The terms "optional" or "optionally" means that the subsequently described event or circumstance may or may not occur, and that the description includes instances where the event occurs and instances where it does not. As used herein the term "fluid" includes any medium or material that flows, including, but not limited to, air.

Approximating language, as used herein throughout the specification and claims, may be applied to modify and quantitative representation that could permissibly vary without resulting in a change in the basic function to which it is related. Accordingly, a value modified by a term or terms, such as "about", "approximately", and "substantially", are note to be limited to the precise value specified. In at least some instances, the approximating language may correspond to the precision of an instrument for measuring the value. Here and throughout the specification and claims, range limitations may be combined and/or interchanged such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such a flash memory. Alternatively, a floppy disk, a compact disc-read only memory (CD-ROM), a magneto-optical disk (MOD), and/or a digital versatile disc (DVD) may also be used. In addition, in the embodiments described herein, additional input channels may be, but are not limited to, computer peripherals associated with an operator interface such as a mouse and a keyboard. Alternatively, other computer peripherals may also be used that may include, for example, but not limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media: includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

By way of background, embodiments of the present application may be used in a combustion turbine engine. It will be understood by those skilled in the art that the present invention is not limited to this type of usage. As stated, the present invention may be used in combustion turbine engines, such as the engines used in power generation and airplanes, steam turbine engines, and other types of rotary engines. The examples provided are not meant to be limiting to the type of the turbine engine.

As discussed in detail below, embodiments described herein provide a method for fabricating an airfoil including a tip portion and a body portion. The method includes casting the tip portion and imaging a radially outward-most end of the body portion, also referred to herein as the second end, to obtain image data of one or more mortises formed therein. The cast tip portion next has one or more tenons formed on a radially inward-most end, also referred to herein as the first end, using the image data of the second end of the body portion. The tenons are formed using additive or subtractive manufacturing techniques. To form the complete airfoil, the first end of the tip portion is positioned relative to the second end of the body portion such that the one or more tenons of the tip portion align with and engage with the one or more mortises of the body portion. As used herein the term "engage" and "sliding engagement" include fixed or non-fixed insertion therein of the tenon, relative to the mortice, so that the tenon extends at least partially into the mortice. The first end of the tip portion and the second end of the body portion are coupled together such that the tip portion and the body portion form the airfoil.

Figure 2:
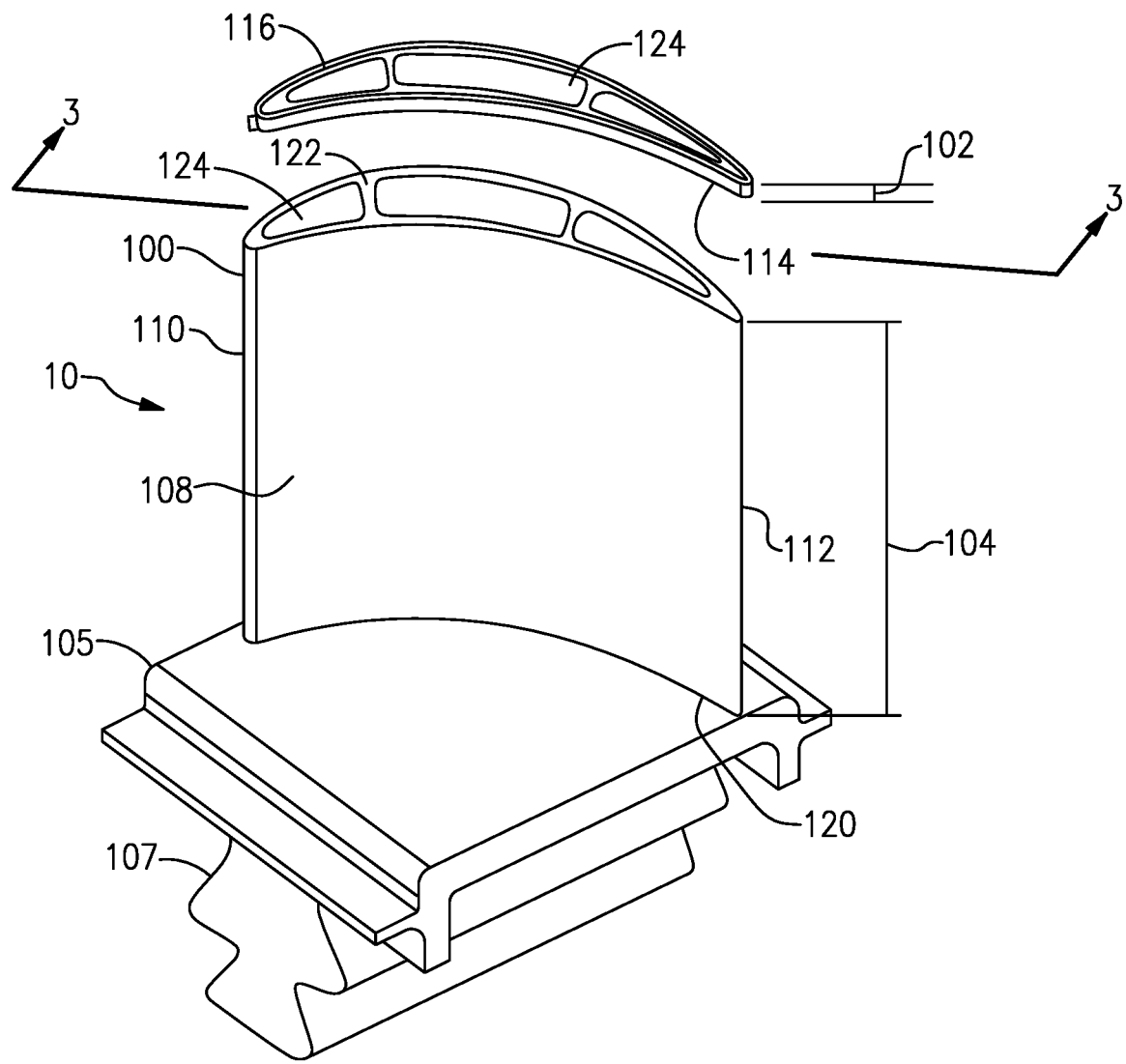
FIG. 2 is a perspective view of the airfoil shown in FIG. 1 with the tip portion spaced from the body portion, in accordance with one or more embodiments shown or described herein.
Figure 3:
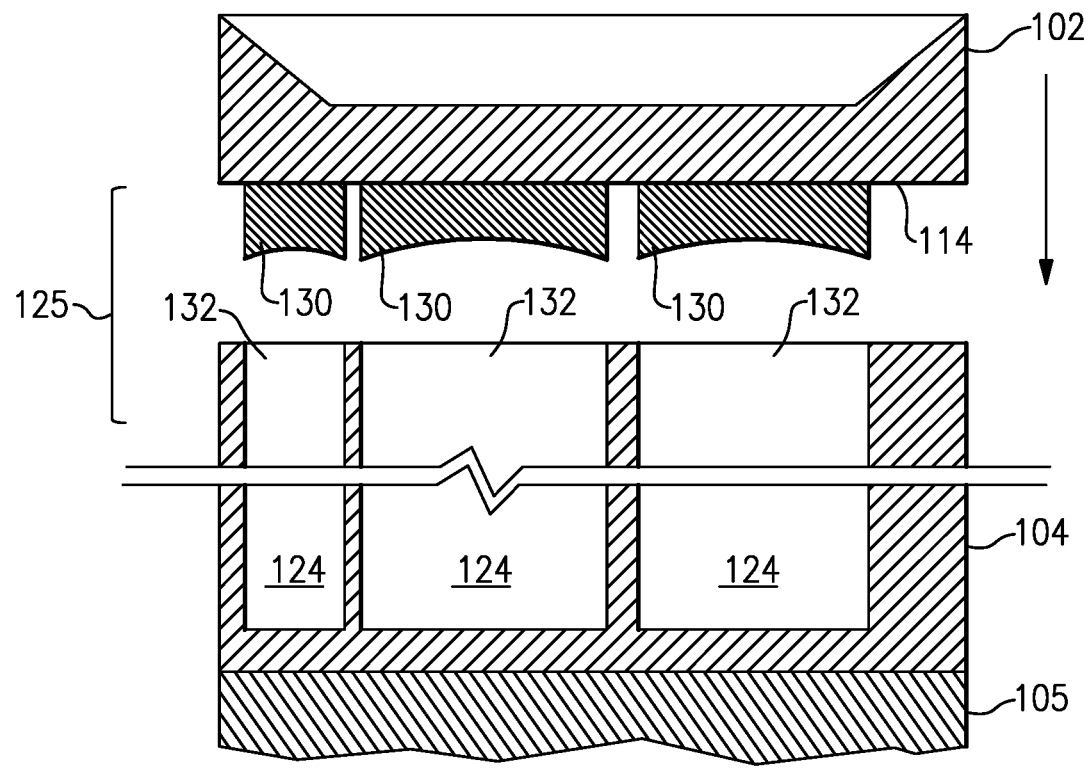
FIG. 3 is a cross-sectional view of a portion of the airfoil shown in FIG. 1 with the tip portion spaced from the body portion, in accordance with one or more embodiments shown or described herein.
Figure 4:
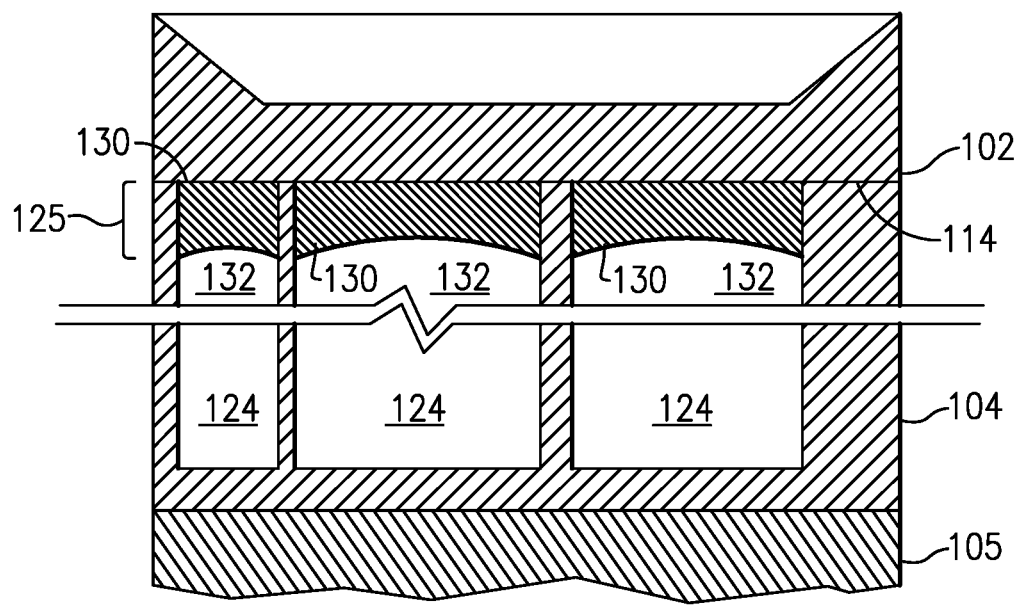
FIG. 4 is a cross-sectional view of a portion of the airfoil shown in FIG. 1 with the tip portion bonded to the body portion, in accordance with one or more embodiments shown or described herein
Figure 18:
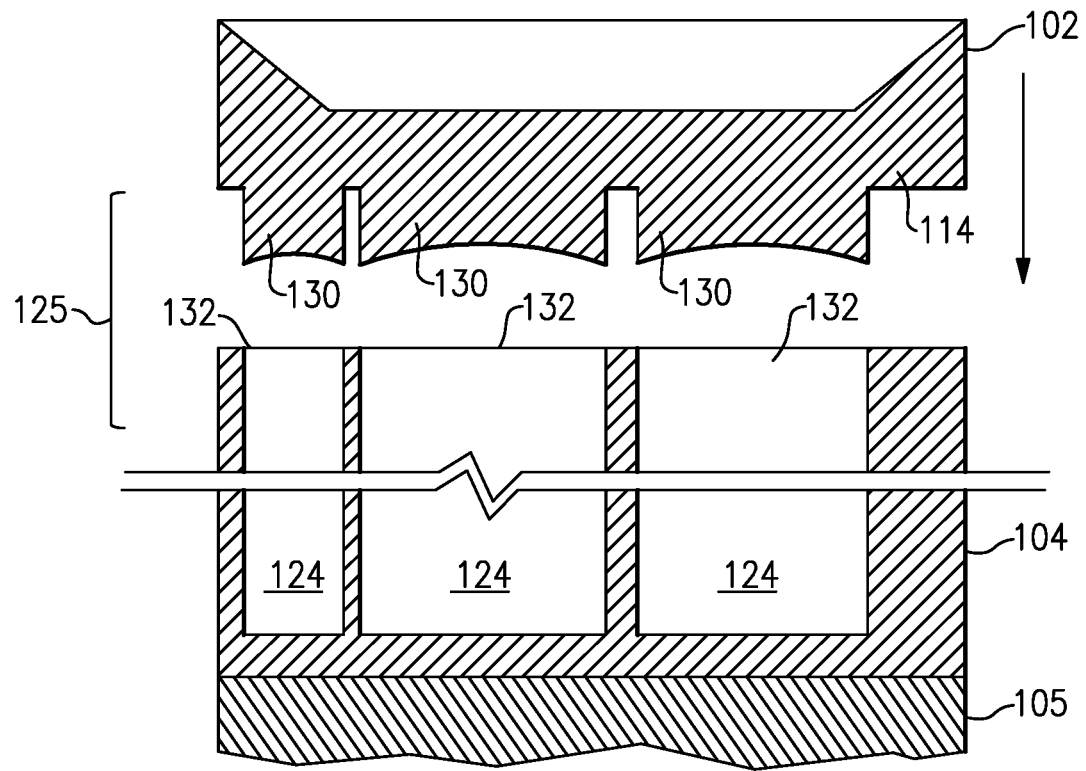
FIG. 18 is a cross-sectional view of a portion of the airfoil shown in FIG. 1 with the tip portion bonded to the body portion, in accordance with one or more embodiments shown or described herein
Figure 19:
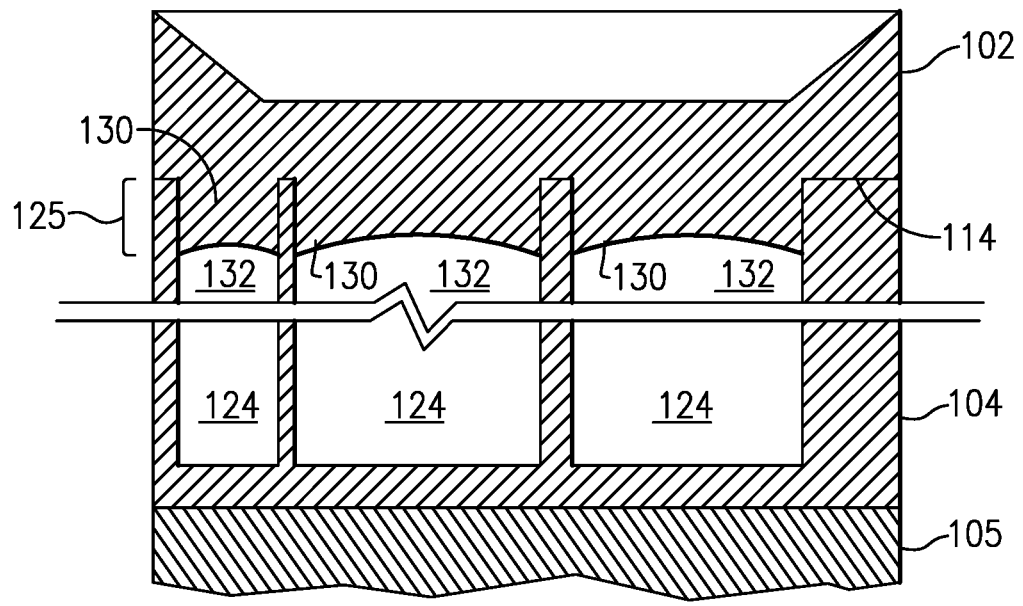
FIG. 19 is a step in fabricating the tip portion of the airfoil shown in FIG. 1, in accordance with one or more embodiments shown or described herein.

Referring now to the drawings, it is noted that like numerals refer to like elements throughout the several views and that the elements shown in the Figures are not drawn to scale and no dimensions should be inferred from relative sizes and distances illustrated in the Figures. Illustrated in FIG. 1 is a perspective view of an exemplary rotor blade 10, and in particular, an airfoil 100 including a tip portion 102 and a body portion 104, formed according to any of the methods disclosed herein. FIG. 2 is a perspective view of the blade, and in particular, the airfoil 100 with the tip portion 102 spaced from the body portion 104, formed according to any of the methods disclosed herein. FIG. 3 is a cross-sectional view of an embodiment of a portion of the airfoil 100 with the tip portion 102 spaced from the body portion 104, formed according to a first method disclosed herein. FIG. 4 is a cross-sectional view of the embodiment of FIG. 3, illustrating the tip portion 102 and the body portion 104 coupled together. FIGS. 5-10 illustrate the method of fabricating and assembling the embodiment of FIGS. 3 and 4. FIGS. 11-17 illustrate another method of fabricating and assembling the airfoil 100 as disclosed herein. FIG. 18 is a cross-sectional view of an embodiment of a portion of the airfoil 100 with the tip portion 102 spaced from the body portion 104, formed according to still another method disclosed herein. FIG. 19 is a cross-sectional view of the embodiment of FIG. 18, illustrating the tip portion 102 and the body portion 104 coupled together. FIGS. 20-23 illustrate the method of fabricating and assembling the embodiment of FIGS. 18 and 19. FIG. 24 is a flow chart of the method 150 of assembling the airfoil 100, as disclosed herein.

Referring more specifically to FIGS. 1 and 2, the airfoil 100 is a rotor blade 10 for a rotary machine, such as a turbomachine, and more specifically a turbine, formed according to any of the methods disclosed herein. Examples, of turbines include gas turbine engines and steam turbines. The airfoil 100 is configured to direct fluid as the turbomachine operates. In alternative embodiments, the airfoil 100 is any airfoil. In the illustrated embodiment, the airfoil 100 further includes a pressure sidewall 106 and a suction sidewall 108. The suction sidewall 106 and the pressure sidewall 108 extend the length of the body portion 104 and the tip portion 102. In the illustrated embodiment, the suction sidewall 106 is substantially convex and the pressure sidewall 108 is substantially concave. The pressure sidewall 108 is coupled to the suction sidewall 106 at a leading edge 110 and at a trailing edge 112. In some embodiments, the airfoil 100 is coupled to a rotor (not shown) such that the trailing edge 112 is downstream from the leading edge 110. In alternative embodiments, the airfoil 100 has any configuration that enables the airfoil 100 to function as described herein.

As best illustrated in FIG. 2, the tip portion 102 includes a first end 114 and a second end 116. The second end 116 is opposite the first end 114. Similarly, in the illustrated embodiment, the body portion 104 includes a first end 120 and a second end 122. The second end 122 is opposite the first end 120. In an embodiment, the body portion 104 may be formed as an open tip (or tip less) component.

A feature that is common to many turbine rotor blades is the circulation of coolant through interior cooling passages during operation, particularly within a platform 105 and the airfoil 100 of the rotor blade. This type of cooling allows the turbine rotor blades to withstand the higher temperatures that are common in many of today's combustion turbine engines. Accordingly, the airfoil 100 may include one or more interior cooling passages 124 that extend from a connection made with a coolant source, which is generally formed through a root 107 (FIGS. 1 and 2) of the rotor blade, toward the tip portion 102. A simplified configuration for such an interior cooling passage 124 is provided in FIG. 2. It will be appreciated that the interior cooling passages 124 may have a variety of configurations and that virtually any configuration may be incorporated into the airfoil 100.

In an embodiment, the tip portion 102 may include one or more features, such as one or more interior cooling passages 124, formed therein. The inclusion of one or more interior cooling passages 124 in the tip portion 102 facilitates fluid flowing through the airfoil 100, and more particularly the tip portion 102, to regulate the temperature of the airfoil 100. In an embodiment, the tip portion 102 does not include interior cooling passages. In another embodiment, the airfoil 100 includes any tip portion 102 that enables the airfoil 100 to operate as described herein, and may include interior cooling passages. In the illustrated embodiment, the body portion 104 includes one or more features, such as one or more interior cooling passages 124, formed therein. The one or more interior cooling passages 124 in the body portion 104 facilitate fluid flowing through the airfoil 100, and more particularly body portion 104, to regulate the temperature of the airfoil 100. In alternative embodiments, the airfoil 100 includes any body portion 104 that enables the airfoil 100 to operate as described herein. It will be appreciated that in an embodiment including one or more interior cooling passages 124 in both the tip portion 102 and the body portion 104, the interior cooling passages 124 of the tip portion 102 of the airfoil 100 and the interior cooling passages 124 of the body portion 104 of the airfoil 100 are configured to align once fitted together.

In the exemplary embodiment, the second end 122 of the body portion 104 contacts the first end 114 of the tip portion 102 as illustrated in FIG. 2. The body portion 104 and the tip portion 102 are aligned such that the suction sidewall 106 and the pressure sidewall 108 extend continuously from the first end 120 of the body portion 104 to the second end 116 of the tip portion 102. The second end 122 is coupled to the first end 114, such as by bonding as described presently, such that the body portion 104 and the tip portion 102 form the airfoil 100. In an alternative embodiment, the tip portion 102 and the body portion 104 are coupled together in any manner that enables the airfoil 100 to operate as described herein.

Referring now to FIGS. 3 and 4, illustrated is a portion of the airfoil 100 formed according to a first method disclosed herein, wherein the tip portion 102 and the body portion 104 are positioned relative to one another. More particularly, in FIG. 3 the tip portion 102 is shown spaced from the body portion 104, and in FIG. 4 the tip portion 102 is shown positioned relative to the body portion 104, prior to the step of bonding them together at a mechanical interlocking interface 125. As best illustrated in FIG. 3, in the embodiment of FIGS. 3-10, the airfoil 100 assembly includes the mechanical interlocking interface 125 formed between the tip portion 102 and the body portion 104. In a preferred embodiment, the mechanical interlocking interface 125 is comprised of one or more nubs, projections, or the like, formed extending from the first end 114 of the tip portion 102 that engage with one or more features, such as grooves, slots, or the one or more cooling passages 124, of the body portion 104. As used throughout this disclosure, each projection of this type will be referred to as a tenon 130, and the corresponding groove or slot will be referred to herein as a mortise 132. It will be appreciated that this type of mechanical interlocking interface 125 allows engagement via sliding of the tenon 130 into the mortise 132. The one or more tenons 130 and the corresponding one or more mortise 132 provide alignment and engagement, so as to prevent movement, subsequent to bonding of the tip portion 102 to the body portion 104 as described herein, of the structures relative to one another.

As shown most clearly in FIG. 3, the mechanical interlocking interface 125 may include a plurality of the tenon 130/mortise 132 pairings. In certain preferred embodiments, between two and four such pairings are provided. The plurality of the tenon 130/mortise 132 pairings provide a way of aligning and maintaining the robustness of the interlocking structure, and more particularly the robustness of the airfoil 100 when the tip portion 102 is coupled to the body portion 104 as seen in FIG. 4.

In the illustrated embodiment, the second end 122 of the body portion 104 is substantially even, i.e., the second end 122 is flat and smooth, and may facilitate deposition of a bonding material (described presently) on the second end 122 if desired. In some embodiments, the second end 122 is smoothed and/or flattened after formation of the body portion 104, and or removal of the tip portion 102 during a repair step. In alternative embodiments, the body portion 104 includes any second end 122 that enables the airfoil 100 to operate as described herein. In an embodiment, the mortises 132 may be portions of the one or more interior cooling passages 124. In another embodiment, the mortises 132 may be specifically formed in the body portion 104 for the purpose of aligning with the tenons 130. In addition, features of the body portion 104 are designed to correspond with different properties of the airfoils 100. As a result, each body portion 104 has a unique second end 122, similar to a fingerprint. In alternative embodiments, the body portion 104 includes any second end 122 that enables the body portion 104 to operate as described herein.

As previously mentioned, each body portion 104 has a unique second end 122, similar to a fingerprint and as currently known in the art, requires a meticulous procedure to align the body portion with a common cast tip portion, which is laborious, tedious and production non-friendly. In addition, a common cast tip portion can have issues with alignment to an unfamiliar blade. By forming custom tip portions 102, as described herein, that match the second end 122 of the airfoil 100, alignment issues can be eliminated and better airflow through the airfoil 100 is achieved.

Figure 5:
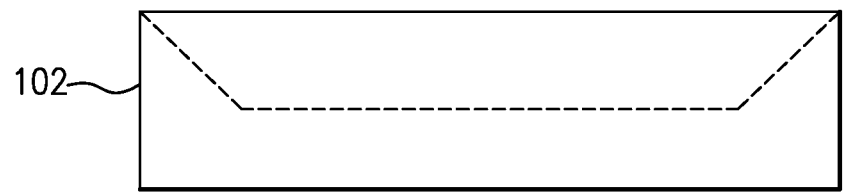
FIG. 5 is a step in fabricating the tip portion of the airfoil shown in FIG. 1, in accordance with one or more embodiments shown or described herein.

Referring still to the first embodiment as illustrated in FIGS. 3-10 and 24, the one or more tenons 130 are formed using additive manufacturing techniques, as described in a method 150. Referring more specifically to FIGS. 5 and 24, in a step 152 and 154 the tip portion 102 is cast in a casting mold (not shown) to form the tip portion 102, that upon completion, will be unique to the body portion 104. In casting the tip portion 102, an alloy material, such as a nickel alloy, may be used that is the same or different than that of the body portion 104. In many instances the tip portion 102 requires more environmental resistance, while the body portion 104 requires more mechanical resistance. By separately producing the tip portion 102 and the body portion 104 as described herein, different materials may be utilized while maintaining a manufacture-friendly process. Upon completion of casting, the cast tip portion 102 is removed from the casting mold, in a step 156 (FIG. 24).

Figure 6:
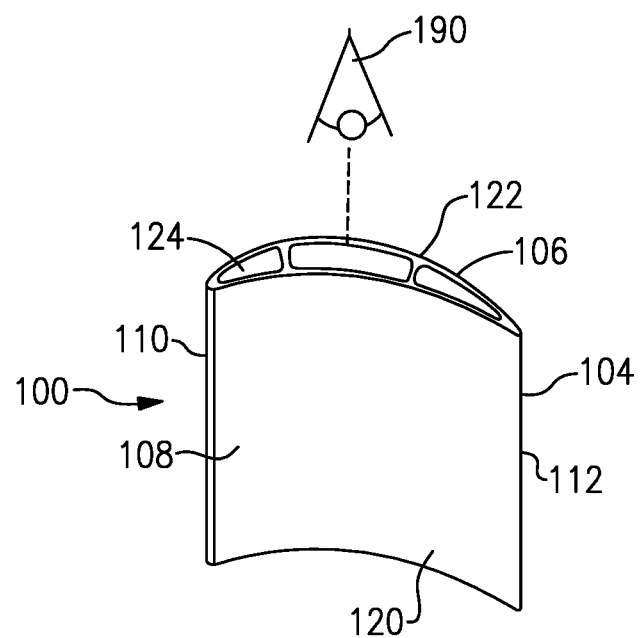
FIG. 6 is a step in fabricating the tip portion of the airfoil shown in FIG. 1, in accordance with one or more embodiments shown or described herein.

Referring now to FIGS. 6 and 24, prior to, simultaneously therewith, or subsequent to the forming of the tip portion in steps 152-156, image data 190 is obtained of the second end 122 of the body portion 104, in a step 160. The obtained image data 190 includes the overall geometry of the body portion 104, and in particular the second end 122, as defined by the suction sidewall 106, the pressure sidewall 108, the leading edge 110, the trailing edge 112 and the one or more interior cooling passages 124 formed therein. In addition, any additional features as previously described, are imaged. In the illustrated embodiment of FIG. 6, the body portion 104 is an open tip, or tip less turbine blade. In another embodiment, the body portion 104 has been prepared for repair, by removing the damaged tip portion 102.

Figure 7:
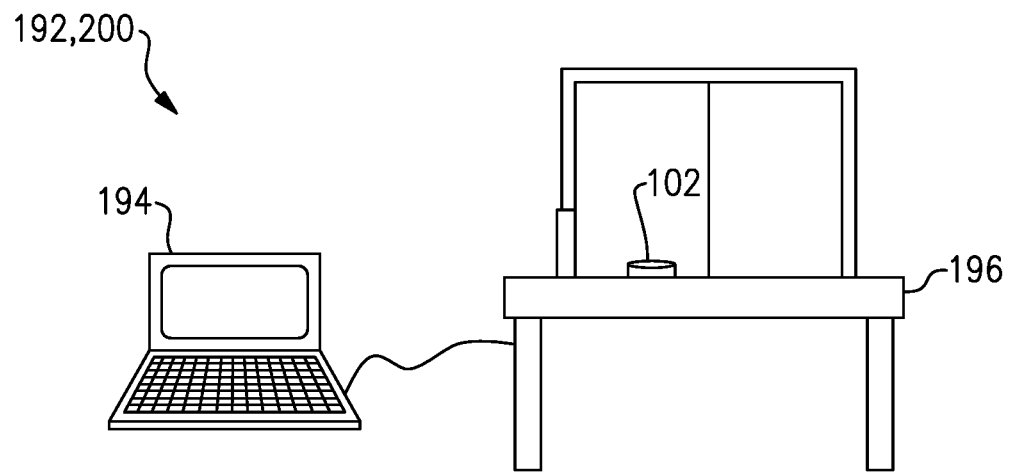
FIG. 7 is a step in fabricating the tip portion of the airfoil shown in FIG. 1, in accordance with one or more embodiments shown or described herein.

Referring to FIGS. 7 and 24, in a step 158, the image data obtained in step 160 is sent to a manufacturing system 192, as schematically illustrated. The manufacturing system 192 includes a computing device 194 and a build platform 196. The computing device 194 includes a computer system that includes at least one processor (not shown in FIG. 7) that executes executable instructions to operate the a manufacturing system 192 and a controller configured to control one or more components of the manufacturing system 192.

Figure 8:
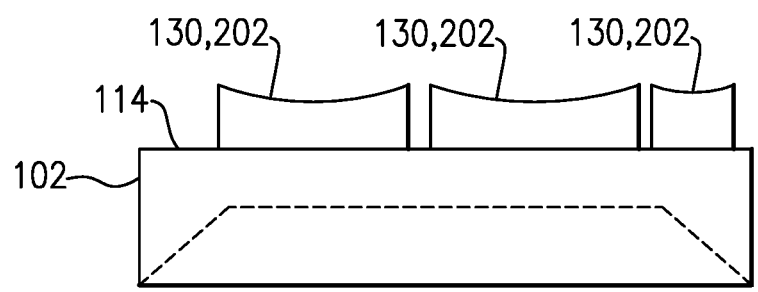
FIG. 8 is a step in fabricating the tip portion of the airfoil shown in FIG. 1, in accordance with one or more embodiments shown or described herein.

Subsequent to obtaining the image data 190 in step 160, the image data 190 is received by the computing device 194, processed and an electronic build file is generated to enable the manufacturing system 192 to form the tenons 130 on the first end 114 of the tip portion 102, in a step 158, and as best illustrated in FIG. 8. In the embodiment of FIGS. 3-10, the manufacturing system 192 is an additive manufacturing system 200. In the embodiment of FIGS. 11-15, the manufacturing system 192 is a subtractive manufacturing system (described presently). The electronic build file includes build parameters that are used to control one or more components of the manufacturing system 192 to build the tenons 130. The build parameters may include, without limitation, power, position, scan strategies and orientation of an associated laser device. In the embodiment of FIG. 7, the computing device and controller 194 are shown as combined as a single device. In other embodiments, the computing device and the controller are separate devices.

In the additive manufacturing system 200 of FIG. 7, the computing device 194 may further store information associated with a melt pool based on electrical signals, which is used to facilitate controlling and refining a build process for the additive manufacturing system 200 or for a specific component built by the additive manufacturing system 200.

The controller includes any suitable type of controller that enables the manufacturing system 192 to function as described herein. In one embodiment, for example, the controller is a computer system that includes at least one processor and at least one memory device that executes executable instructions to control the operation of the manufacturing system 192 based on the obtained image data 140 of the second end 122 of the body portion 104. The controller is configured to control one or more components of the manufacturing system 192 based on build parameters associated with the build file stored, for example, within the computing device 194.

In the embodiment of FIG. 7, the build platform 196 includes a powdered build material that is melted and re-solidified during the additive manufacturing process to build the one or more tenons 130, and more specifically, one or more additively manufactured tenons 202, on the cast tip portion 102, as best illustrated in FIG. 8, and in a step 172 of FIG. 24. As illustrated in FIG. 8, in the exemplary embodiment, the one or more additively manufactured tenons 202 include varying geometry, to define the tip portion 102 and align and engage with the one or more mortises 132 of the second end 122 of the body portion 104, obtained from the image data 190 obtained in step 160. In an embodiment, the powdered build material used to build the one or more additively manufactured tenons 202 may include materials suitable for forming such components. In the illustrated embodiment, the powdered build material is comprised of a metal based material. In other embodiments, the powdered build material includes any suitable type of powdered build material. In yet other embodiments, the powdered build material includes any suitable build material that enables the additive manufacturing system 180 to function as described, including, for example and without limitation, ceramic powders, metal-coated ceramic powders, and thermoset or thermoplastic resins.

Figure 9:
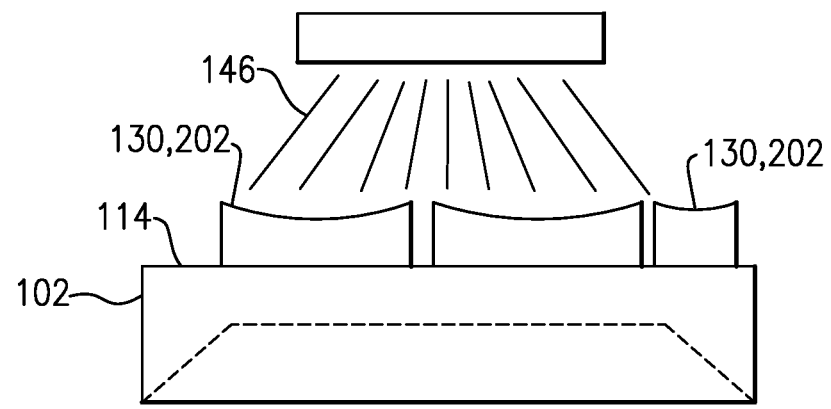
FIG. 9 is a step in fabricating the tip portion of the airfoil shown in FIG. 1, in accordance with one or more embodiments shown or described herein.

In a step 180, as best illustrated in FIGS. 9 and 24, the first end 114 of the tip portion 102 is next coated with a bonding material 146. In the exemplary embodiment, depositing 180 the bonding material 146 on the first end 114 includes a cathodic arc deposition process and/or any other deposition process. In alternative embodiments, the bonding material 146 is deposited on the tip portion 102, the one or more additively manufactured tenons 202, and/or the body portion 104 in any manner that enables the bonding material 146 to function as described herein. For example, in some embodiments, the bonding material 146 is deposited using, without limitation, any physical vapor deposition process, such as cathodic arc, ion plasma, electron beam, sputtering, evaporation, cold spraying, and thermal spraying.

Figure 10:
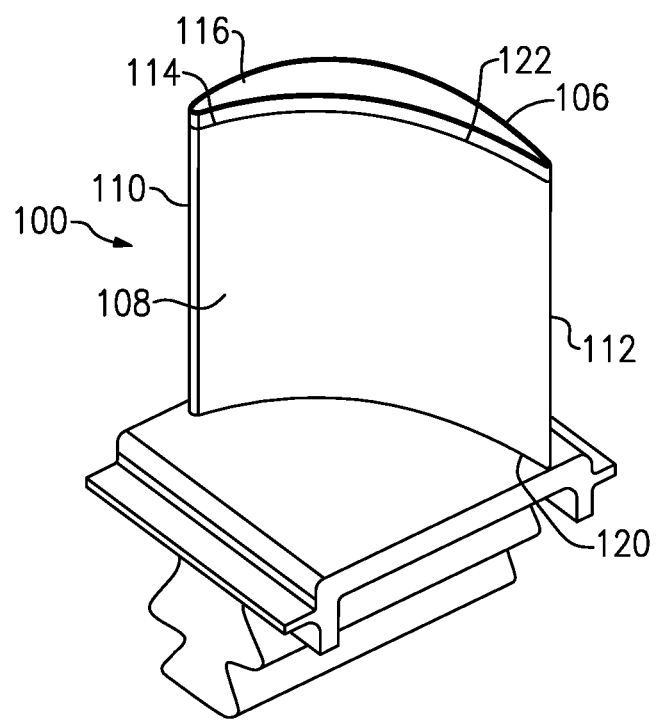
FIG. 10 is a step in fabricating the tip portion of the airfoil shown in FIG. 1, in accordance with one or more embodiments shown or described herein.
Figure 11:
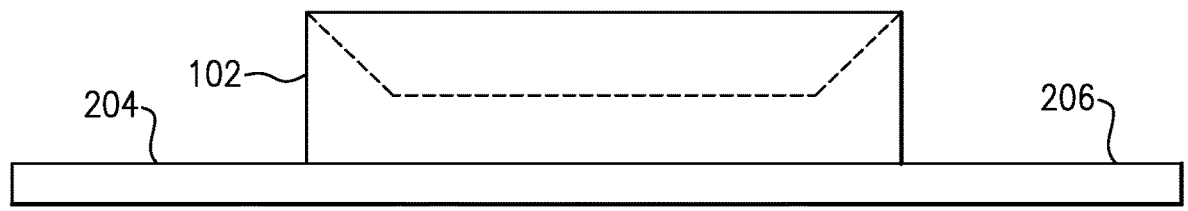
FIG. 11 is a step in fabricating the tip portion of the airfoil shown in FIG. 1, in accordance with one or more embodiments shown or described herein.

In a step 182, as best illustrated in FIGS. 10 and 24, the tip portion 102 is positioned relative to the body portion 104. More particularly, the tip portion 102 is positioned relative to the body portion 104 prior to coupling the tip portion 102 and the body portion 104 together, such that the one or more additively manufactured tenons 202 of the tip portion 102 align and engage with one or more mortises 132 of the body portion 104. In a step 184, the tip portion 102 and the body portion 104 are placed together in a fixture and undergo a heat treat cycle. More particularly, the tip portion 102 and the body portion 104 undergo a primary heat treatment where the two are bonded together to form the complete airfoil 100. A second heat treatment may provide for further bonding.

Referring now to FIGS. 11-16, in an alternate embodiment and method, in contrast to the embodiment of FIGS. 3-10, the tip portion 102 is formed using additive manufacturing techniques. In reference to FIG. 11, similar to the previous described method, the tip portion is formed in a step 152. In this particular embodiment, the tip portion 102 is fabricated using additive manufacturing techniques, in a step 170, such as described in copending U.S. patent application bearing Ser. No. 15/603,377, by Scott Andrew Weaver, entitled "Airfoil and Method of Fabricating Same", which is hereby incorporated by reference. More particularly, in this particular embodiment, a plate-like component 204 is provided. In an embodiment, the plate-like component 204 is formed of a material, similar to that of the body portion 104, such as a nickel bearing alloy, from which blades may be constructed from. The tip portion 102 is fabricated, in step 170 on a first side 206 of the plate 103 that upon completion will be unique to the body portion 104. In an embodiment, in additively manufacturing the tip portion 102, the plate-like component 204 and the additive manufacturing materials may include an alloy material that is the same or different than that of the body portion 104. As previously stated, in many instances the tip portion 102 requires more environmental resistance, while the body portion 104 requires more mechanical resistance. By separately producing the tip portion 102 and the body portion 104 as described herein, different materials may be utilized while maintaining a manufacture-friendly process.

Figure 12:
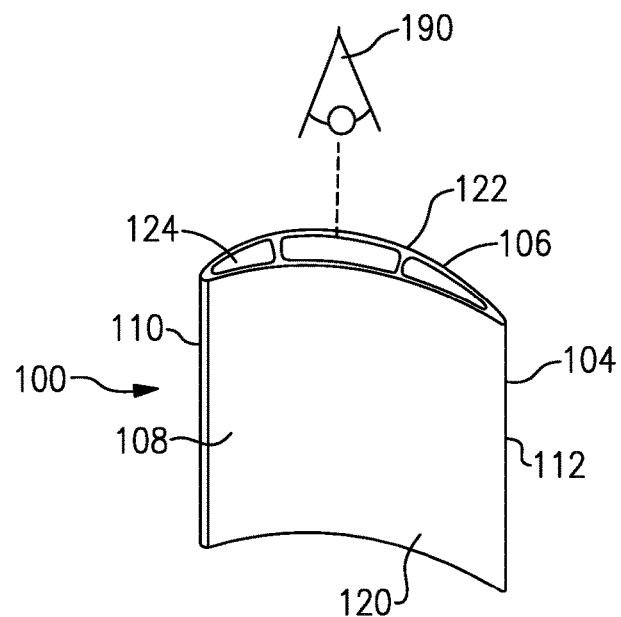
FIG. 12 is a step in fabricating the tip portion of the airfoil shown in FIG. 1, in accordance with one or more embodiments shown or described herein.

Referring now to FIGS. 12 and 24, as in the previous embodiment, prior to, simultaneously therewith, or subsequent to the forming of the tip portion in steps 152 and 170, image data 190 is obtained of the second end 122 of the body portion 104, in a step 160, as previously described.

Figure 13:
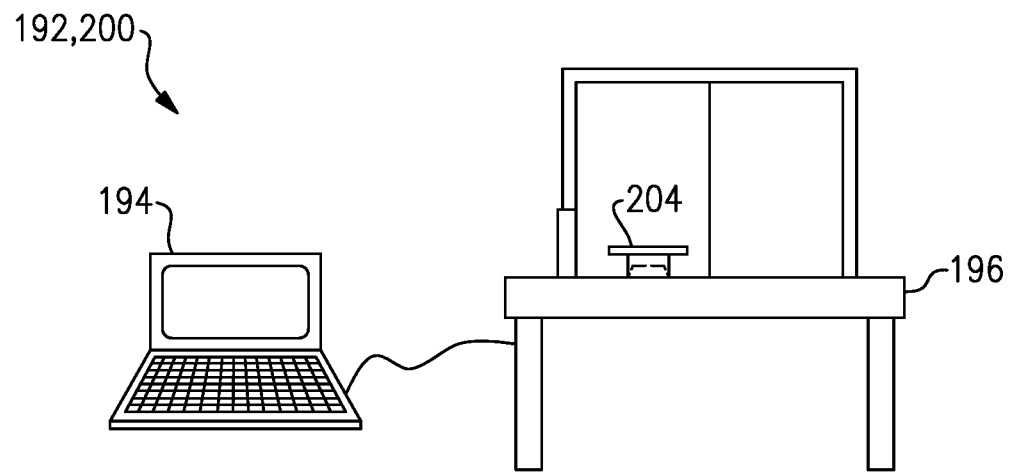
FIG. 13 is a step in fabricating the tip portion of the airfoil shown in FIG. 1, in accordance with one or more embodiments shown or described herein.

Referring to FIGS. 13 and 24, in a step 162, the image data obtained in step 160 is sent to a manufacturing system 192, as schematically illustrated. The manufacturing system 192 includes a computing device 194 and a build platform 196. The computing device 194 includes a computer system that includes at least one processor (not shown in FIG. 13) that executes executable instructions to operate the a manufacturing system 192 and a controller configured to control one or more components of the manufacturing system 192, as previously described.

Figure 14:
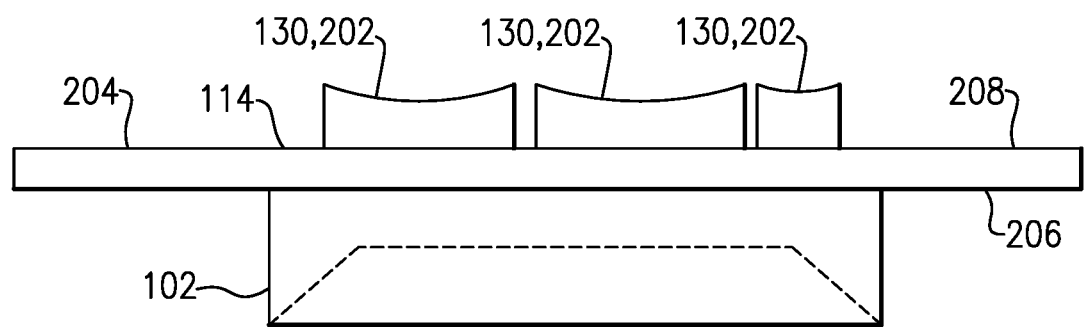
FIG. 14 is a step in fabricating the tip portion of the airfoil shown in FIG. 1, in accordance with one or more embodiments shown or described herein.

Subsequent to obtaining the image data 190 in step 160, the image data 190 is received by the computing device 194, processed and an electronic build file is generated to enable the manufacturing system 192 to form the tenons 130 on a second side 208 of the plate-like component 204, in a step 172, and as best illustrated in FIG. 14. Similar to the embodiment of FIGS. 3-10, in the embodiment of FIGS. 11-16, the manufacturing system 192 is an additive manufacturing system 200, as previously described.

In the embodiment of FIG. 14, the additive manufacturing system 200 uses a powdered build material that is melted and re-solidified during the additive manufacturing process to build the one or more tenons 130, and more specifically, one or more additively manufactured tenons 202, on the second side 208 of the plate-like component 204. As illustrated in FIG. 14, in the exemplary embodiment, the one or more additively manufactured tenons 202 include varying geometry, to define the tip portion 102 and align and engage with the one or more mortises 132 of the second end 122 of the body portion 104, obtained from the image data 190 obtained in step 160.

Figure 15:
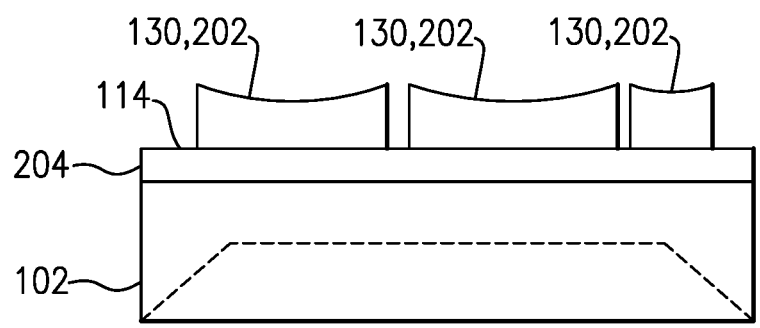
FIG. 15 is a step in fabricating the tip portion of the airfoil shown in FIG. 1, in accordance with one or more embodiments shown or described herein.

In a step 174, as best illustrated in FIGS. 15 and 24, the plate-like component 204 is cut so as to provide the complete tip portion 102, including a remaining portion of the plate-like component 204 onto which the additively manufactured tenons 202 were built. The complete tip portion 102 defining the first end 114 of the tip portion 102. In an embodiment, one or more tip portion 102 may be manufactured and cut from a single plate-like component 204.

Figure 16:
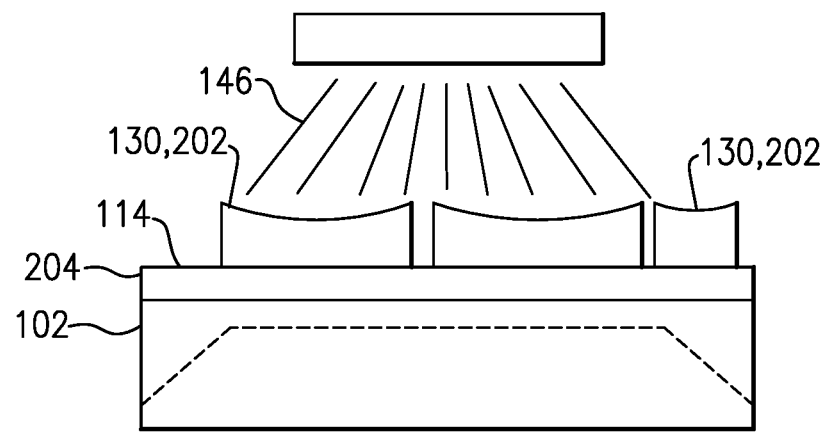
FIG. 16 is a step in fabricating the tip portion of the airfoil shown in FIG. 1, in accordance with one or more embodiments shown or described herein.

In a step 180, as best illustrated in FIGS. 16 and 24, the first end 114 of the tip portion 102 is next coated with a bonding material 146, as previously described with regard to FIG. 9.

Figure 17:
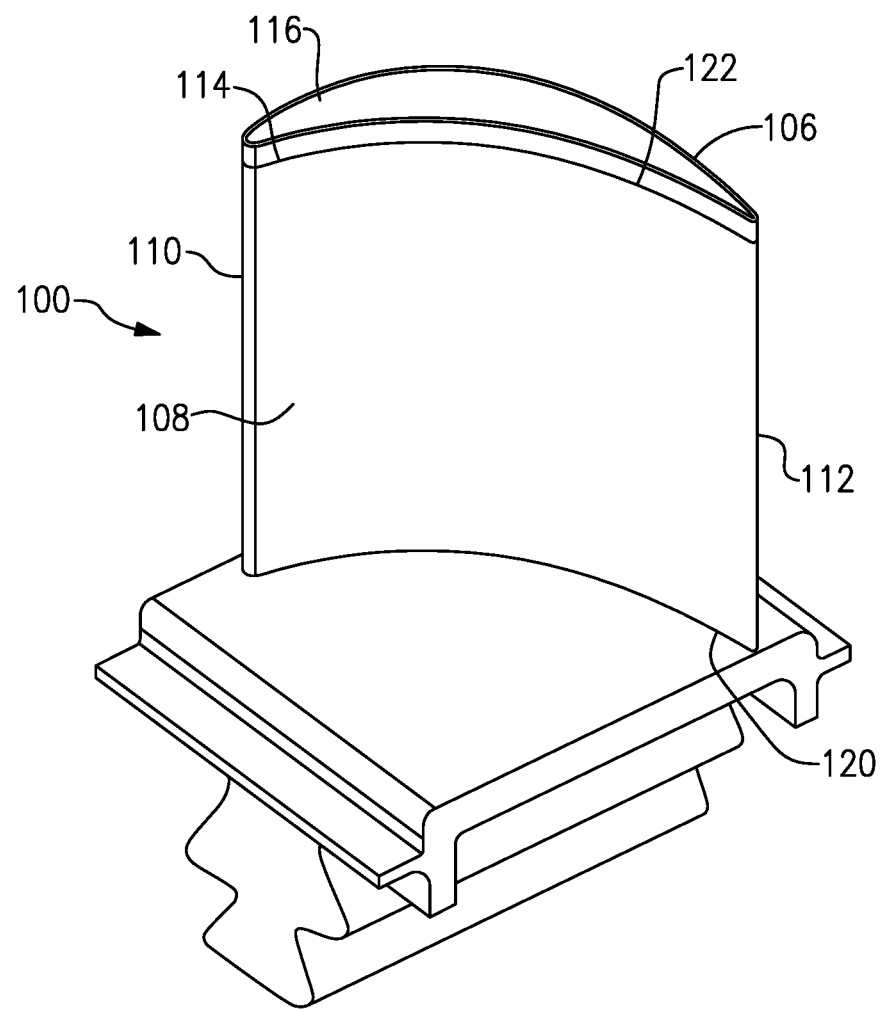
FIG. 17 is a cross-sectional view of a portion of the airfoil shown in FIG. 1 with the tip portion spaced from the body portion, in accordance with one or more embodiments shown or described herein.

In a step 182, as best illustrated in FIGS. 17 and 24, the tip portion 102 is positioned relative to the body portion 104. More particularly, the tip portion 102 is positioned relative to the body portion 104 prior to coupling the tip portion 102 and the body portion 104 together, such that the one or more additively manufactured tenons 202 of the tip portion 102 align and engage with one or more mortises 132 of the body portion 104. In a step 184, the tip portion 102 and the body portion 104 are placed together in a fixture and undergo a heat treat cycle. More particularly, the tip portion 102 and the body portion 104 undergo a primary heat treatment where the two are bonded together to form the complete airfoil 100. A second heat treatment may provide for further bonding.

Referring now to FIGS. 17-23, in an alternate embodiment and method, the one or more tenons 130 are formed using subtractive manufacturing techniques, as described in the method 150. In reference to FIGS. 17 and 18, in this particular embodiment, the tip portion 102 and the body portion 104 are illustrated positioned relative to one another and including one or more integrally formed tenons 130. More particularly, in FIG. 18 the tip portion 102 is shown spaced from the body portion 104, and in FIG. 19 the tip portion 102 is shown positioned relative to the body portion 104, prior to the step of bonding them together at a mechanical interlocking interface 125. As best illustrated in FIG. 18, and similar to the embodiment of FIGS. 3-17, the airfoil 100 assembly includes the mechanical interlocking interface 125 formed between the tip portion 102 and the body portion 104. As previously described, the mechanical interlocking interface 125 is comprised of one or more tenons 130 extending from the first end 114 of the tip portion 102 that engage with one or more mortises 132 of the body portion and may include a plurality of the tenon 130/mortise 132 pairings.

Similar to the previous embodiment of FIGS. 3-10, in a step 152 the tip portion 102 is cast in a casting mold (not shown) to form the tip portion 102, that upon completion will be unique to the body portion 104. Upon completion of casting, the cast tip portion 102 is removed from the casting mold, in a step 154 (FIG. 24). In contrast to the embodiment of FIGS. 3-10, in this particular embodiment the cast tip portion 102 is cast to include additional material so as to provide for the subtractive manufacture of the tenons 130 on the first end 114, as described presently.

Figure 20:
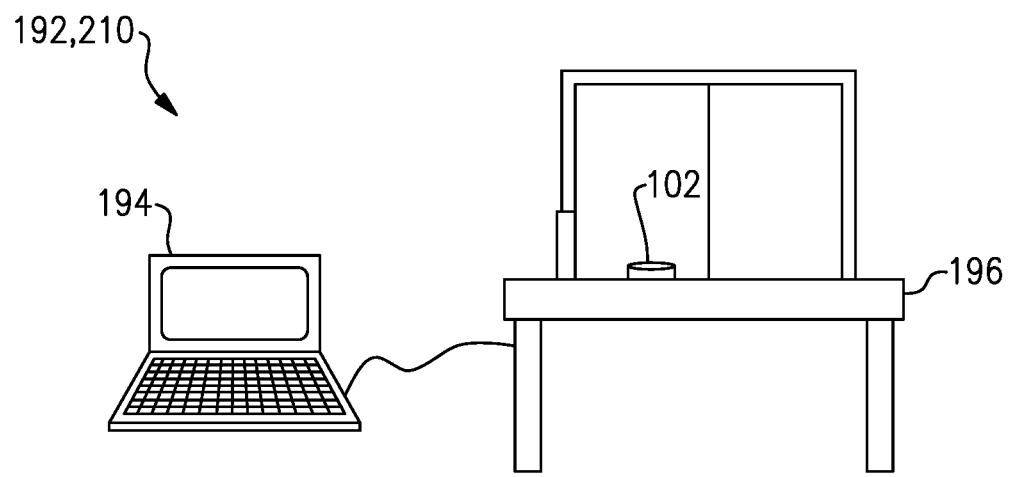
FIG. 20 is a step in fabricating the tip portion of the airfoil shown in FIG. 1, in accordance with one or more embodiments shown or described herein.
Figure 21:
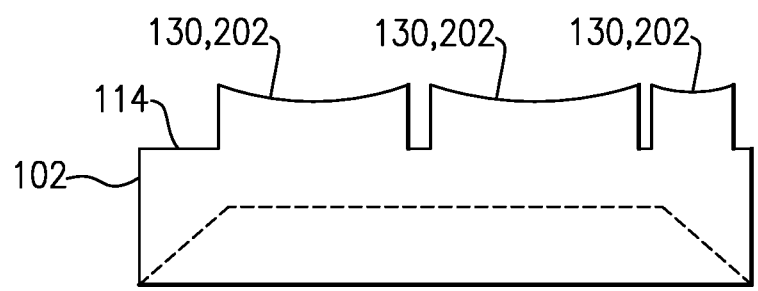
FIG. 21 is a step in fabricating the tip portion of the airfoil shown in FIG. 1, in accordance with one or more embodiments shown or described herein.

Referring now to FIGS. 20 and 24, prior to, simultaneously therewith, or subsequent to the casting of the tip portion in steps 152-156, image data 190 is obtained of the second end 122 of the body portion 104, in a step 160, as previously described with regard to FIGS. 3-17. In a step 162, the image data 190 obtained in step 160 is sent to a manufacturing system 192, as schematically illustrated. The manufacturing system 192 includes a computing device 194 and a build platform 196. The image data 140 is received by the computing device 194, processed and an electronic build file is generated to enable the manufacturing system 192 to form the tenons 130 on the first end 114 of the tip portion 102, in a step 158 as best illustrated in FIGS. 21 and 24. In contrast to the first embodiment, in the embodiment of FIGS. 17-23, the manufacturing system 192 is a subtractive manufacturing system 210, configured to integrally form one or more machined tenons 212 in the additional material initially cast with the tip portion 102. The electronic build file includes build parameters that are used to control one or more components of the manufacturing system 192 to machine the one or more tenons 130, and more specifically the one or more machined tenons 212. The build parameters may include, without limitation, power, position, scan strategies and orientation of an associated laser device.

In the subtractive manufacturing system 210 of FIG. 20, the computing device 194 may further store information associated with a machining techniques based on electrical signals, which is used to facilitate controlling and refining a machining process for the subtractive manufacturing system 210, so as to form the one or more machined tenons 212.

As illustrated in FIG. 21, in the exemplary embodiment, the one or more machined tenons 212 include varying geometry, to define the tip portion 102 and align and engage with the one or more mortises 132 of the second end 122 of the body portion 104, obtained from the image obtained in step 160. As previously described, in contrast to the embodiments of FIGS. 3-17 including the additive manufacture tenons 202, the tip portion 102 of this embodiment includes integrally formed machined tenons 212.

Figure 22:
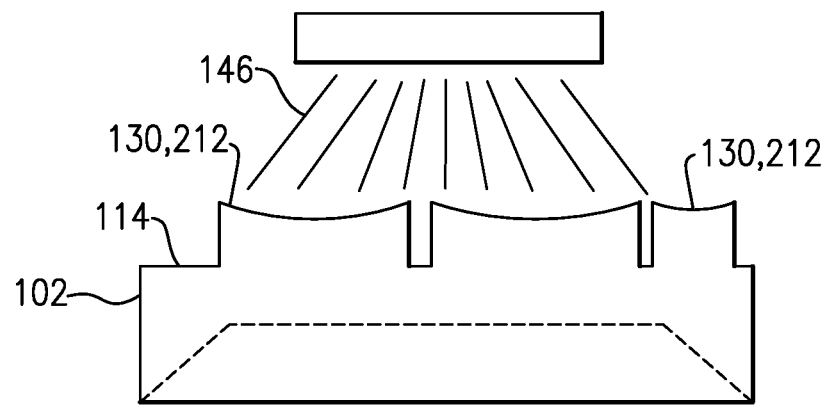
FIG. 22 is a step in fabricating the tip portion of the airfoil shown in FIG. 1, in accordance with one or more embodiments shown or described herein.

In a step 180, as best illustrated in FIGS. 22 and 24, the first end 114 of the tip portion 102 is next coated with a bonding material 146. In the exemplary embodiment, depositing 180 the bonding material 146 on the first end 114 includes a cathodic arc deposition process and/or any other deposition process. In alternative embodiments, the bonding material 146 is deposited on the tip portion 102, the one or more machined tenons 212, and/or the body portion 104 in any manner that enables the bonding material 146 to function as described herein. As previously described, the bonding material 146 is deposited using, without limitation, any physical vapor deposition process, such as cathodic arc, ion plasma, electron beam, sputtering, evaporation, cold spraying, and thermal spraying.

Figure 23:
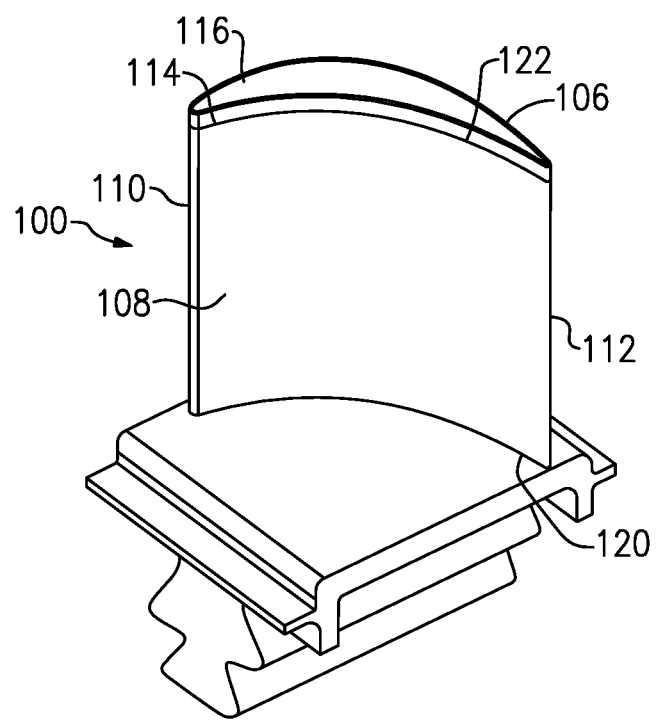
FIG. 23 is a step in fabricating the tip portion of the airfoil shown in FIG. 1, in accordance with one or more embodiments shown or described herein.
Figure 24:
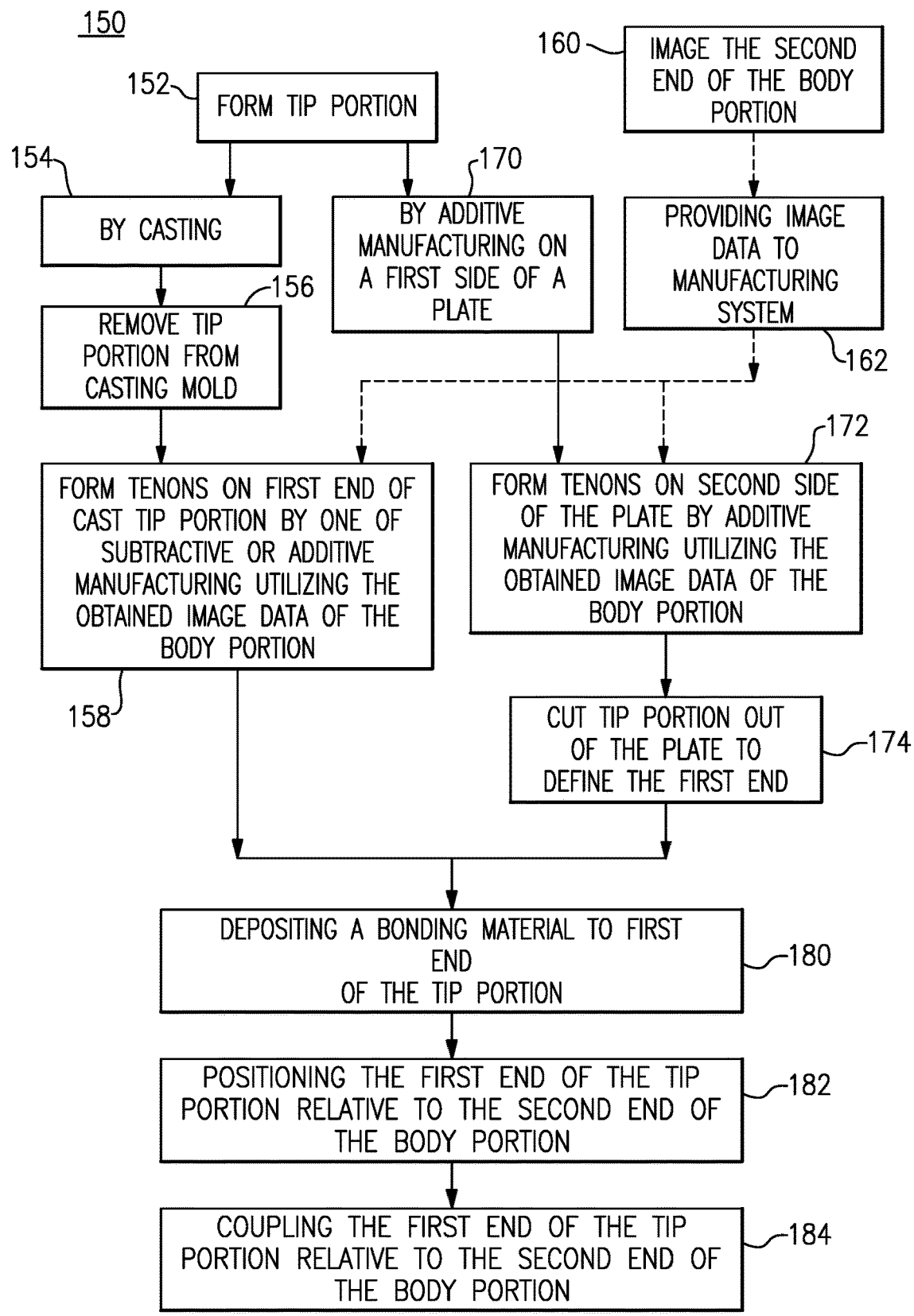
FIG. 24 is a flow chart of an exemplary method of assembling the airfoil shown in FIG. 1, in accordance with one or more embodiments shown or described herein.

In a step 182, as best illustrated in FIGS. 23 and 24, the tip portion 102 is positioned relative to the body portion 104. More particularly, the tip portion 102 is positioned relative to the body portion 104 prior to coupling the tip portion 102 and the body portion 104 together, such that the one or more machined tenons 212 of the tip portion 102 align and engage with one or more mortises 132 of the body portion 104. In a step 184, the tip portion 102 and the body portion 104 are placed together in a fixture and undergo a heat treat cycle. More particularly, the tip portion 102 and the body portion 104 undergo a primary heat treatment where the two are bonded together to form the complete airfoil 100. A second heat treatment may provide for further bonding.

In the embodiments of FIGS. 3-23, during assembly of the airfoil 100 and prior to bonding of the tip portion 102 and the body portion 104, the bonding material 146 is positioned between the first end 114 and the second end 122. The bonding material 146 is configured to at least partially bond the tip portion 102 and the body portion 104. In particular, during assembly of the airfoil 100, the bonding material 146 is heated above a specified bonding temperature and at least partially bonds to each of the tip portion 102 and the body portion 104. In an embodiment, the bonding material 146 is heated to a temperature above the melting point of the bonding material 146 and below the melting point of the tip portion 102 and/or the body portion 104. In further embodiments, the bonding material 146 is configured to remain at least partially in a solid state and bond the tip portion 102 and the body portion 104 together. Accordingly, in some embodiments, the bonding material 146 is not heated to a temperature above the melting point of the bonding material 146. In alternative embodiment, the tip portion 102 and the body portion 104 are bonded together in any manner that enables the airfoil 100 (shown in FIG. 1) to operate as described herein. For example, in some embodiments, the tip portion 102 and the body portion 104 are bonded together using, without limitation, any physical vapor deposition process, such as cathodic arc, ion plasma, electron beam, sputtering, evaporation, cold spraying, and thermal spraying. In further embodiment, the bonding material 146 is omitted.

In an embodiment, the bonding material 146 includes a composition of a nickel alloy and boron. In alternative embodiments, the bonding material 146 includes any material that enables the airfoil 100 to operate as described herein. For example, in some embodiments, the bonding material 146 includes an alloy having characteristics similar to the tip portion 102 and/or the body portion 104. In further embodiments, the bonding material 146 includes a composition of structural alloy and a melting point depressant. Examples of structural alloys include, without limitations, any of the following: an iron alloy, a nickel alloy, and a cobalt alloy. Examples of melting point depressants include, without limitations, any of the following boron and silicon.

In some embodiments, the bonding material 146 has a maximum thickness in a range of about 1 mil (0.0254 millimeters (mm)) to about 10 mil (0.254 mm). In alternative embodiments, the bonding material 146 has any thickness that enables the airfoil 100 to operate as described herein.

Referring again to FIG. 24, illustrated is a flow chart of the method 150 of assembling the airfoil 100 (shown in FIG. 1). With reference to FIGS. 3-23, the method 150 of FIG. 24 generally includes forming the tip portion 152, by either casting 154 the tip portion 102 in a casting mold and removing 156 the cast tip portion 102 from the casting mold or by additively manufacturing 170 the tip portion on a plate-like component 204.

Prior to, simultaneously therewith, or subsequent to the forming of the tip portion 102, the method 150 further includes imaging 160 the second end 122 of the body portion to obtain image data 190 and providing 162 the image data 190 to a manufacturing system 192. Further method 150 steps include forming 158 or 172 one or more tenons 130, relative to the tip portion 102 or the plate-like component 204, by one of machining (subtractive) or additive manufacturing the tenons 130 utilizing the obtained image data 190 of the body portion 104. In an embodiment where the tip portion 102 is formed on the plate-like component 204, the tip portion 102 is next cut 174 from the plate-like component 204. The method 140 further includes depositing 180 the bonding material 146 on at least one of the tip portion 102 and the body portion 104, positioning 182 the first end 120 of the tip portion 102, and more particularly the one or more tenons 130, relative to the second end 122 of the body portion 104, and more particularly the one or more mortises 132, prior to coupling, such that the one or more tenons 130 of the tip portion 102 align and engage with the one or more mortises 132 of the body portion 104, and coupling 184 the tip portion 102 to the body portion 104.

In some embodiments, the method 150 includes preparing and/or cleaning a surface of the airfoil 100. For example, in some embodiments, excess material is removed from the tip portion 102 and/or the body portion 104 prior to bonding the portions together. In further embodiments, material, such as a thin layer of bonding material 146, is removed from the one or more interior cooling passages 124 after the tip portion 102 and the body portion 104 are bonded to facilitate air flowing through the one or more interior cooling passages 124.

Accordingly, disclosed is a method of manufacturing a blade tip portion including a mechanical interlocking interface with a body portion of the blade from an image of the interface surface of the body portion. This disclosure describes how a tip portion that includes one or more alignment features that are made to match one or more alignment features of the top face of the body portion of a blade provides for a self-aligning system that is more manufacture-friendly, while reducing potential scrap materials produced. By initially forming the tip portion, and subsequently forming alignment features on the tip portion, to form a custom tip portion that matches an open tip (or tip less) turbine blade exactly, alignment issues are eliminated and improved airflow through the airfoil is achieved. The use of either additive manufacturing or subtractive manufacture to form the alignment features on the tip portion provides that the tip portion can be produced rapidly with no issues of mismatch to that of the body portion of the airfoil. In addition, once the image of the airfoil interface, and more particularly the second end of the body portion, is made, it can be stored digitally and then reused to make another tip portion for the same blade for rework should the blade need it after service. The disclosed method of imaging a body portion, and forming alignment features on the tip portion based on the image data of the body portion, allows for accurate alignment of any cooling passages formed therein, as well as external surface of the blade.

In addition, the method of manufacturing the tip portion including a mechanical interlocking interface with the body portion of the blade may have significant economic advantages. For example, the tip portion may be manufactured using materials that are similar to those used in the body portion (i.e., ceramic based or different alloys), or different from those used in the body portion, which may allow the usage of cheaper materials. As one of ordinary skill in the art will appreciate, this will also allow for different casting methods for the manufacture of the tip portion and the body portion.

An exemplary technical effect of the methods and apparatus described herein includes at least one of the following: (a) decreasing time and cost required to assemble airfoils; (b) providing an airfoil tip portion that couples to an airfoil body portion; (c) providing an airfoil tip portion that aligns with an airfoil body portion; and (d) facilitating forming alignment features on an airfoil tip portion based on image data obtained of the body portion.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It should be understood that the foregoing relates only to the preferred embodiments of the present application and that numerous changes and modifications may be made herein by one of ordinary skill in the art without departing from the general spirit and scope of the invention as defined by the following claims and the equivalents thereof.

The invention claimed is:

1. A method of fabricating an airfoil, the airfoil including a tip portion including a first end and a second end and a body portion including a first end and a second end, said method comprising:
   forming the tip portion;
   imaging the second end of the body portion to obtain image data of one or more mortises formed therein;
   forming one or more tenons extending therefrom the first end of the tip portion using the image data of the second end of the body portion, wherein the one or more tenons are formed using additive manufacturing techniques;
   positioning a first end of the tip portion relative to the second end of the body portion such that the one or more tenons of the tip portion align with and engage with the one or more mortises of the body portion; and
   coupling the first end of the tip portion to the second end of the body portion such that the tip portion and the body portion form the airfoil.

2. The method in accordance with claim 1, wherein forming the tip portion includes additively manufacturing the tip portion.

3. The method in accordance with claim 2, wherein forming the tip portion includes additively manufacturing the tip portion on a plate-like component, and wherein the plate-like component defines the first end of the tip portion.

4. The method in accordance with claim 1, where the one or more mortises of the body portion are one or more cooling passages.

5. The method in accordance with claim 1, further comprising depositing a bonding material on at least one of the first end of the tip portion, at least a portion of the one or more tenons and the second end of the body portion.

6. The method in accordance with claim 1, wherein coupling the first end of the tip portion to the second end of the body portion includes heating the bonding material above a specified temperature, wherein the specified temperature is less than a melting point of at least one of the tip portion and the body portion.

7. A method of fabricating an airfoil, the airfoil including a tip portion including a tip portion including a first end and a second end and a body portion including a first end and a second end, said method comprising:
   forming the tip portion;
   imaging a second end of the body portion to obtain image data of one or more mortises formed therein an end portion;
   manufacturing one or more tenons extending therefrom the first end of the tip portion using the image data of the second end of the body portion, wherein the step of manufacturing includes additive manufacturing;
   depositing a bonding material on at least one of a first end of the tip portion, the one or more tenons and a second end of the body portion;
   positioning the first end of the tip portion relative to the second end of the body portion to allow sliding engagement of each of the one or more tenons into a respective one of the one or more mortise and define a mechanical interlocking interface; and
   coupling the first end of the tip portion to the second end of the body portion such that the tip portion and the body portion form the airfoil.

8. The method in accordance with claim 7, wherein forming the tip portion includes additively manufacturing the tip portion.

9. The method in accordance with claim 7, wherein forming the tip portion includes additively manufacturing the tip portion on a plate-like component, and cutting the tip portion from the plate-like component subsequent to manufacturing the one or more tenons, wherein the plate-like component defines the first end of the tip portion.

10. The method in accordance with claim 7, where the one or more mortises of the body portion are one or more cooling passages.

11. The method in accordance with claim 7, further comprising coupling the airfoil to a rotor such that the airfoil directs fluid, wherein the airfoil has a pressure side and a suction side, the pressure side and the suction side extending from the body portion to the tip portion.

12. An airfoil of a rotary machine comprising:
   a tip portion comprising a first end and a second end, the tip portion including one or more additively manufactured tenons extending from the first end; and
   a body portion comprising a first end and a second end, said second end of the body portion configured to couple to said first end of said tip portion, said body portion including one or more mortises extending into the second end, wherein each of said one or more tenons of the tip portion are in sliding engagement with a corresponding one of said one or more mortises of the body portion,
   wherein said one or more tenons of the tip portion are based on image data of the second end of the body portion.

13. The airfoil in accordance with claim 12, wherein the tip portion is an additively manufactured tip portion.

14. The airfoil in accordance with claim 12, wherein the tip portion includes a plate-like component that defines the first end of the tip portion.

15. The airfoil in accordance with claim 12, wherein the body portion is one of an open tip turbine blade casting or a tipless turbine blade.

16. The airfoil in accordance with claim 12, wherein the one or more mortises of the body portion are one or more cooling passages.

* * * * *